(12) United States Patent
Elia et al.

(10) Patent No.: US 8,263,519 B2
(45) Date of Patent: *Sep. 11, 2012

(54) SOUR SERVICE DEWAXING CATALYST WITHOUT SEPARATE HYDROGENATION FUNCTION

(75) Inventors: Christine N. Elia, Bridgewater, NJ (US); Mohan Kalyanaraman, Media, PA (US); Michel A. Daage, Hellertown, PA (US); Stephen H. Brown, Bernardsville, NJ (US); Lei Zhang, Vienna, VA (US); Robert A. Crane, Hammonds Plains (CA); Valery Sokolovskii, Sunnyvale, CA (US); David M. Lowe, Sunnyvale, CA (US); Jun Han, Sunnyvale, CA (US); Nicholas Ohler, San Leandro, CA (US); Daniel M. Giaquinta, Saratoga, CA (US); Anthony F. Volpe, Jr., Santa Clara, CA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 443 days.

This patent is subject to a terminal disclaimer.

(21) Appl. No.: 12/316,977

(22) Filed: Dec. 18, 2008

(65) Prior Publication Data

US 2009/0176643 A1    Jul. 9, 2009

Related U.S. Application Data

(60) Provisional application No. 61/009,384, filed on Dec. 28, 2007.

(51) Int. Cl.
*B01J 29/06* (2006.01)
(52) U.S. Cl. ........................................................ 502/66
(58) Field of Classification Search .................... None
See application file for complete search history.

(56) References Cited

U.S. PATENT DOCUMENTS

| | | | |
|---|---|---|---|
| 6,602,402 B1 * | 8/2003 | Benazzi et al. | 208/58 |
| 6,923,949 B1 * | 8/2005 | Lai et al. | 423/709 |
| 2003/0018228 A1 * | 1/2003 | Vaughn et al. | 585/500 |
| 2003/0102254 A1 * | 6/2003 | Eijsbouts et al. | 208/216 R |
| 2005/0040073 A1 * | 2/2005 | Cody et al. | 208/89 |
| 2006/0173228 A1 * | 8/2006 | Chang | 585/638 |

* cited by examiner

*Primary Examiner* — Emily Le
*Assistant Examiner* — Michael Forrest
(74) *Attorney, Agent, or Firm* — Robert A. Migliorini

(57) ABSTRACT

Catalysts for dewaxing of hydrocarbon feeds, particularly feeds with elevated sulfur and nitrogen levels, are provided. The dewaxing catalysts include a zeolite with a low silica to alumina ratio combined with a low surface binder, or alternatively the formulated catalyst has a high ratio of zeolite surface area to external surface area.

13 Claims, 3 Drawing Sheets

SOUR SERVICE DEWAXING CATALYST WITHOUT SEPARATE HYDROGENATION FUNCTION

This application claims the benefit of U.S. Provisional Application No. 61/009,384 filed Dec. 28, 2007.

FIELD OF THE INVENTION

This invention provides a catalyst and a method of using such a catalyst for processing of high sulfur and/or nitrogen content lubricating oil basestocks.

BACKGROUND OF THE INVENTION

Catalytic dewaxing is now a part of many processes for production of desired hydrocarbon products from basestocks having an appropriate boiling range. Catalytic dewaxing allows for conversion of less desirable molecules within a basestock into molecules with more favorable properties for a particular application. Catalytic dewaxing can be used to improve the properties of basestocks in order to form lubricating oils. Catalytic dewaxing also has applications in other areas, such as improvement of cold flow properties of diesel fuels.

Catalytic dewaxing can occur by either cracking of feedstock molecules or by isomerization of feedstock molecules. Catalysts which perform dewaxing primarily by cracking tend to produce products with lower viscosity index and also tend to have lower yields than catalysts which perform dewaxing primarily by isomerization. As a result, isomerization dewaxing catalysts are preferred in many applications.

Conventional isomerization dewaxing catalysts, however, are susceptible to poisoning by sulfur and nitrogen contaminants in a feedstock. As a result, a hydrotreating step or other pre-treatment step often precedes a catalytic dewaxing step, in order to reduce the sulfur and/or nitrogen in a feedstock. Even with a pre-treatment step to remove sulfur, the susceptibility of dewaxing catalysts to sulfur or nitrogen poisoning limits the types of basestocks that can be processed by catalytic dewaxing. Additionally, if a reactor "upset" occurs, so that feedstock is not processed properly in the pre-treatment step, it may be necessary to replace a dewaxing catalyst exposed to high levels of sulfur or nitrogen.

An alternative for feedstocks containing higher levels of nitrogen and sulfur is to solvent dewax the feedstock. While solvent dewaxing is effective for feedstocks with higher levels of impurities, solvent dewaxing is much more costly than catalytic dewaxing. Thus, a catalytic dewaxing solution for dewaxing of high impurity level feedstocks would be preferred.

SUMMARY OF THE INVENTION

In an embodiment, a supported catalyst is provided that includes a zeolite having a $SiO_2:Al_2O_3$ ratio of 100 or less, 0.05 wt % or less of a metal hydrogenation component, and a metal oxide binder having a surface area of 100 $m^2/g$ or less in powder form prior to formulation of the supported catalyst. The zeolite and the metal oxide binder are combined to form the supported catalyst.

In another embodiment, a supported catalyst is provided that includes a zeolite having a $SiO_2:Al_2O_3$ ratio of 100 or less, 0.05 wt % or less of a metal hydrogenation component, and a metal oxide binder. The supported catalyst has a ratio of zeolite surface area to external surface area of at least 80:100.

In still another embodiment, a supported catalyst is provided that consists essentially of a zeolite having a $SiO_2:Al_2O_3$ ratio of 100 or less, the zeolite being ZSM-48, ZSM-23, EU-2, EU-11, ZBM-30, or a combination thereof and a metal oxide binder.

DETAILED DESCRIPTION OF THE EMBODIMENTS

Figure 1:
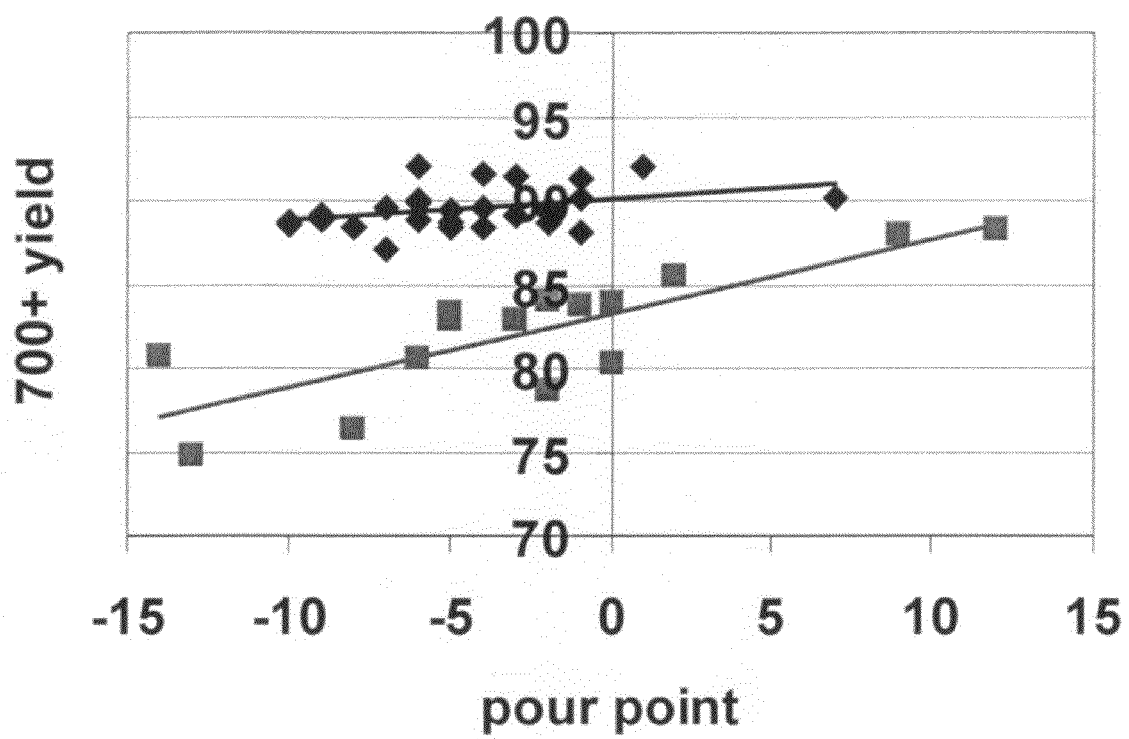
FIGS. 1 to 3 show the activity of various catalysts for lowering the pour point of a hydrocarbon feed.

In various embodiments, the invention provides a catalyst suitable for dewaxing of hydrocarbon feedstocks, including sour feedstocks containing high levels of sulfur and/or nitrogen. The catalysts of the invention provide an activity advantage relative to conventional dewaxing catalysts in the presence of high sulfur or high nitrogen feeds. This advantage is achieved by the use of ZSM-48 or ZSM-23 with a low silica to alumina ratio and formulated using a binder having a low surface area, but without inclusion of a separate hydrogenation function, such as a Group VIII noble metal. Alternatively, this advantage is achieved by the use of a dewaxing catalyst that includes ZSM-48 or ZSM-23 with a low silica to alumina ratio and having a high ratio of zeolite surface area to external surface area.

A dewaxing catalyst that operates without a separate metal hydrogenation component provides significant advantages from a cost standpoint. In many types of dewaxing catalysts, the cost of metal represents a substantial or even a majority of the cost of the catalyst. Thus, the ability to achieve sufficient activity without including a separate metal hydrogenation component would provide significant cost savings for a hydroprocessing unit. Alternatively, this same advantage would also apply to catalysts which include low amounts of a metal hydrogenation component, such as 0.05 wt % or less.

In addition to a cost advantage for the catalyst, a dewaxing catalyst without a separate metal hydrogenation component can provide process operation and cost advantages as well. In particular, the absence of a metal hydrogenation component allows a metal-free or low metal catalyst to perform dewaxing while minimizing the amount of hydrogen consumption. It is believed that this will also lead to an increase in the percentage of cracking relative to the percentage of isomerization. However, for applications such as treatment of high sulfur content feedstocks for forming Group I basestocks, such an increase in cracking is acceptable.

In this invention, it has been unexpectedly found that using a combination of ZSM-48 or ZSM-23 with a low ratio of silica to alumina and a binder with a desirable surface area improves the catalytic activity of dewaxing catalysts. It has further unexpectedly been found that the improved performance can be achieved without the use of a metal hydrogenation function. In an embodiment, the combination of a zeolite having a sufficiently low silica:alumina ratio with a binder having a low surface area provides the process improvement. In another embodiment, the improvement to catalytic activity is based on providing a formulated catalyst that includes a low silica:alumina ratio zeolite that also has a desirable ratio of external surface area to zeolite surface area.

The external surface area and the zeolite surface area refer to one way of characterizing the total surface area of a catalyst. These surface areas are calculated based on analysis of nitrogen porosimetry data using the BET method for surface area measurement. Previous work has shown that the amount of zeolite content versus binder content in catalyst can be determined from BET measurements. (See, for example, Johnson, M.F.L., Jour. Catal., 52, 425 (1978).) In the discussion below, "external surface area" refers to the surface area that is believed to be attributable to the binder in the catalyst, while the "zeolite surface area" refers to the surface area that is believed to be attributable to the zeolite or other dewaxing catalyst in the BET measurements.

One of the advantages of the catalysts according to the invention is that a wide variety of hydrocarbon feedstreams can be processed without harming the functionality and/or performance of the catalyst. Suitable feedstreams for use with the inventive catalysts can be kerosene, diesel, lubricating oil feedstocks, and other distillate feedstreams including wax-containing feedstreams such as feeds derived from crude oils, shale oils, and tar sands. Synthetic feeds such as those derived from the Fischer-Tropsch can also be treated. Typical wax-containing feedstocks for the preparation of lubricating base oils have initial boiling points of about 315° C. or higher, and include feeds such as reduced crudes, hydrocrackates, raffinates, hydrotreated oils, atmospheric gas oils, vacuum gas oils, coker gas oils, atmospheric and vacuum resids, deasphalted oils, slack waxes and Fischer-Tropsch wax. Such feeds may be derived from distillation towers (atmospheric and vacuum), hydrocrackers, hydrotreaters and solvent extraction units, and may have wax contents of up to 50% or more. Suitable feedstreams can also contain aromatics, such as up to 10 wt % aromatics, or up to 25 wt % aromatics, or up to 50 wt % aromatics.

One of the advantages of the inventive catalyst is the ability to maintain catalytic activity in the presence of elevated levels of nitrogen and sulfur. Conventional catalysts often require pre-treatment of a feedstream to reduce the nitrogen content to a few ppm and the sulfur content to less than a few hundred ppm. By contrast, hydrocarbon feedstreams containing up to 0.2 30 wt. % of nitrogen, based on the feedstream, and up to 3.0 wt. % of sulfur can be effectively processed using the inventive catalysts. In an embodiment, the sulfur content of a feedstream can be at least 0.05 wt % sulfur, or at least 0.1 wt %, or at least 0.5 wt %, or at least 1 wt %, or at least 2 wt %, or at least 3 wt %. In another embodiment, the nitrogen content of the feedstream can be at least 25 wppm, or at least 50 wppm, or at least 100 wppm, or at least 250 wppm, or at least 500 wppm. Sulfur and nitrogen contents may be measured by standard ASTM methods D2622 and D4629, respectively.

The catalysts according to the invention are ZSM-48, ZSM-23, and corresponding zeolites with similar structures. Materials with a structure similar to ZSM-48 include EU-2, EU-11, and ZBM-30. Note also that a zeolite having the ZSM-23 structure with a silica to alumina ratio of from about 20:1 to about 40:1 can sometimes be referred to as SSZ-32.

In embodiments where the catalyst includes ZSM-48 or a similar structure, the silica to alumina ratio in the zeolite is preferably 100:1 or less, or 85:1 or less, or 75:1 or less, or 70:1 or less. In embodiments where the zeolite is ZSM-23 (or a structural equivalent), the silica to alumina ratio can be 75:1 or less, or 50:1 or less, or 40:1 or less.

In embodiments where the catalyst is formulated using a low surface area binder, a low surface area binder represents a binder with a surface area of 100 m$^2$/g or less, or 80 m$^2$/g or less, or 60 m$^2$/g or less.

In embodiments where the catalyst has a desired ratio of zeolite surface area to external surface area, the zeolite surface area will be roughly equal to or greater than the external surface area. In an embodiment, the ratio of zeolite surface area to external surface area is at least 80:100, or at least 90:100, or at least 95:100. Preferably, the ratio of zeolite surface area to external surface area is at least 100:100 (or 1:1), or at least 105:100, or at least 110:100, or at least 115:100.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture.

In yet another embodiment, a binder composed of two or more metal oxides can also be used. In such an embodiment, the weight percentage of the low surface area binder is preferably greater than the weight percentage of the higher surface area binder. For example, in a catalyst that is composed of 65 wt % zeolite and 35 wt % of a binder composed of two or more metal oxides, it is preferable to have at least 20 wt % of the lower surface area binder. Alternatively, if both metal oxides used for forming a mixed metal oxide binder have a sufficiently low surface area, the proportions of each metal oxide in the binder are less important. When two or more metal oxides are used to form a binder, the two metal oxides can be incorporated into the catalyst by any convenient method. For example, one binder can be mixed with the zeolite during formation of the zeolite powder, such as during spray drying. The spray dried zeolite/binder powder can then be mixed with the second metal oxide binder prior to extrusion.

Without being bound by any particular theory, use of a low surface area binder and/or a formulated catalyst with a high ratio of zeolite surface area to external surface area is believed to increase access to the active sites of the zeolite (e.g. acid sites). Especially for feeds containing bulky molecules, increased access to zeolite active sites is expected to lead to an overall increase in activity.

In an alternative embodiment, the catalysts according to the invention can further include up to 0.05 wt % of a metal hydrogenation component. While it is preferable to have a catalyst without a separate metal hydrogenation component, as this provides the maximum operating cost advantage, some advantages of the invention can be partially achieved by a catalyst with a sufficiently low amount of metal hydrogenation component. In other embodiments, the amount of metal hydrogenation component is 0.02 wt % or less, or 0.01 wt % or less, or 0.005 wt % or less. The metal hydrogenation component is typically a Group VI and/or a Group VIII metal. Preferably, the metal hydrogenation component is a Group VIII noble metal. More preferably, the metal hydrogenation component is Pt, Pd, or a mixture thereof.

The metal hydrogenation component may be added to the catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

One example of a dewaxing catalyst suitable for use in the claimed invention is ZSM-48 with a SiO$_2$:Al$_2$O$_3$ ratio of less than 110, preferably from about 70 to about 110. In the embodiments below, ZSM-48 crystals will be described variously in terms of "as-synthesized" crystals that still contain the organic template; calcined crystals, such as Na-form ZSM-48 crystals; or calcined and ion-exchanged crystals, such as H-form ZSM-48 crystals.

The ZSM-48 crystals after removal of the structural directing agent have a particular morphology and a molar composition according to the general formula:

(n)SiO$_2$:Al$_2$O$_3$ where n is from 70 to 110, preferably 80 to 100, more preferably 85 to 95. In another embodiment, n is at least 70, or at least 80, or at least 85. In yet another embodiment, n is 110 or less, or 100 or less, or 95 or less. In still other embodiments, Si may be replaced by Ge and Al may be replaced by Ga, B, Fe, Ti, V, and Zr.

The as-synthesized form of ZSM-48 crystals is prepared from a mixture having silica, alumina, base and hexamethonium salt directing agent. In an embodiment, the molar ratio of structural directing agent:silica in the mixture is less than 0.05, or less than 0.025, or less than 0.022. In another embodiment, the molar ratio of structural directing agent:silica in the mixture is at least 0.01, or at least 0.015, or at least 0.016. In still another embodiment, the molar ratio of structural directing agent:silica in the mixture is from 0.015 to 0.025, preferably 0.016 to 0.022. In an embodiment, the as-synthesized form of ZSM-48 crystals has a silica:alumina molar ratio of 70 to 110. In still another embodiment, the as-synthesized form of ZSM-48 crystals has a silica:alumina molar ratio of at least 70, or at least 80, or at least 85. In yet another embodiment, the as-synthesized form of ZSM-48 crystals has a silica:alumina molar ratio of 110 or less, or 100 or less, or 95 or less. For any given preparation of the as-synthesized form of ZSM-48 crystals, the molar composition will contain silica, alumina and directing agent. It should be noted that the as-synthesized form of ZSM-48 crystals may have molar ratios slightly different from the molar ratios of reactants of the reaction mixture used to prepare the as-synthesized form. This result may occur due to incomplete incorporation of 100% of the reactants of the reaction mixture into the crystals formed (from the reaction mixture).

The ZSM-48 zeolite in either a calcined or as-synthesized form typically forms agglomerates of small crystals that may have crystal sizes in the range of about 0.01 to about 1 μm. These small crystals are desirable for they generally lead to greater activity. Smaller crystals mean greater surface area which leads to a greater number of active catalytic sites per given amount of catalyst. Preferably, the ZSM-48 crystals in either a calcined or as-synthesized form have a morphology containing no fibrous crystals. By fibrous is meant crystals that have a L/D ratio of >10/1, where L and D represent the length and diameter of the crystal. In another embodiment, the ZSM-48 crystals in either a calcined or as-synthesized form have a low quantity or are free of needle-like crystals. By needle-like is meant crystals that have a L/D ratio of <10/1, preferably less than 5/1, more preferably between 3/1 and 5/1. The SEM shows that crystals prepared according to the methods herein have no detectable crystals having a fibrous or needle-like morphology. This morphology alone or coupled with the low silica:alumina ratios leads to catalysts having high activity as well as desirable environmental features.

The ZSM-48 composition is prepared from an aqueous reaction mixture comprising silica or silicate salt, alumina or soluble aluminate salt, base and directing agent. To achieve the desired crystal morphology, the reactants in reaction mixture have the following molar ratios:

SiO$_2$:Al$_2$O$_3$=70 to 110

H$_2$O:SiO$_2$=1 to 500

OH$^-$:SiO$_2$=0.1 to 0.3

OH$^-$:SiO$_2$ (preferred)=0.14 to 0.18 template:SiO$_2$=0.01-0.05 template:SiO$_2$ (preferred)=0.015 to 0.025

In the above ratios, two ranges are provided for both the base:silica ratio and the structure directing agent:silica ratio. The broader ranges for these ratios include mixtures that result in the formation of ZSM-48 crystals with some quantity of Kenyaite and/or needle-like morphology. For situations where Kenyaite and/or needle-like morphology is not desired, the preferred ranges should be used, as is further illustrated below in the Examples.

The silica source is preferably precipitated silica and is commercially available from Degussa. Other silica sources include powdered silica including precipitated silica such as Zeosil® and silica gels, silicic acid colloidal silica such as Ludox® or dissolved silica. In the presence of a base, these other silica sources may form silicates. The alumina may be in the form of a soluble salt, preferably the sodium salt and is commercially available from US Aluminate. Other suitable aluminum sources include other aluminum salts such as the chloride, aluminum alcoholates or hydrated alumina such as gamma alumina, pseudobohemite and colloidal alumina. The base used to dissolve the metal oxide can be any alkali metal hydroxide, preferably sodium or potassium hydroxide, ammonium hydroxide, diquaternary hydroxide and the like. The directing agent is a hexamethonium salt such as hexamethonium dichloride or hexamethonium hydroxide. The anion (other than chloride) could be other anions such as hydroxide, nitrate, sulfate, other halide and the like. Hexamethonium dichloride is N,N,N,N',N',N'-hexamethyl-1,6-hexanediammonium dichloride.

In an embodiment, the crystals obtained from the synthesis according to the invention have a morphology that is free of fibrous morphology. Fibrous morphology is not desired, as this crystal morphology inhibits the catalytic dewaxing acitivty of ZSM-48. In another embodiment, the crystals obtained from the synthesis according to the invention have a morphology that contains a low percentage of needle-like morphology. The amount of needle-like morphology present in the ZSM-48 crystals can be 10% or less, or 5% or less, or 1% or less. In an alternative embodiment, the ZSM-48 crystals can be free of needle-like morphology. Low amounts of needle-like crystals are preferred for some applications as needle-like crystals are believed to reduce the activity of ZSM-48 for some types of reactions. To obtain a desired morphology in high purity, the ratios of silica:alumina, base:silica and directing agent:silica in the reaction mixture according to embodiments of the invention should be employed. Additionally, if a composition free of Kenyaite and/or free of needle-like morphology is desired, the preferred ranges should be used.

The as-synthesized ZSM-48 crystals should be at least partially dried prior to use or further treatment. Drying may be accomplished by heating at temperatures of from 100 to 400° C., preferably from 100 to 250° C. Pressures may be atmospheric or subatmospheric. If drying is performed under partial vacuum conditions, the temperatures may be lower than those at atmospheric pressures Catalysts are typically bound with a binder or matrix material prior to use. Binders are resistant to temperatures of the use desired and are attrition resistant. Binders may be catalytically active or inactive and include other zeolites, other inorganic materials such as clays and metal oxides such as alumina, silica, titania, zirconia, and silica-alumina. Clays may be kaolin, bentonite and montmorillonite and are commercially available. They may be blended with other materials such as silicates. Other porous matrix materials in addition to silica-aluminas include other binary materials such as silica-magnesia, silica-thoria, silica-zirconia, silica-beryllia and silica-titania as well as ternary materials such as silica-alumina-magnesia, silica-alumina-thoria and silica-alumina-zirconia. The matrix can be in the form of a co-gel. The bound ZSM-48 may range from 10 to 100 wt. % ZSM-48, based on bound ZSM-48 with the balance being binder.

ZSM-48 crystals as part of a catalyst may also be used with a metal hydrogenation component. Metal hydrogenation components may be from Groups 6-12 of the Periodic Table based on the IUPAC system having Groups 1-18, preferably Groups 6 and 8-10. Examples of such metals include Ni, Mo, Co, W, Mn, Cu, Zn, Ru, Pt or Pd, preferably Pt or Pd. Mixtures of hydrogenation metals may also be used such as Co/Mo, Ni/Mo, Ni/W and Pt/Pd, preferably Pt/Pd. The amount of hydrogenation metal or metals may range from 0.1 to 5 wt. %, based on catalyst. In an embodiment, the amount of metal or metals is at least 0.1 wt %, or at least 0.25 wt %, or at least 0.5 wt %, or at least 0.6 wt %, or at least 0.75 wt %. In another embodiment, the amount of metal or metals is 5 wt % or less, or 4 wt % or less, or 3 wt % or less, or 2 wt % or less, or 1 wt % or less. Methods of loading metal onto ZSM-48 catalyst are well known and include, for example, impregnation of ZSM-48 catalyst with a metal salt of the hydrogenation component and heating. The ZSM-48 catalyst containing hydrogenation metal may also be sulfided prior to use. The catalyst may also be steamed prior to use.

High purity ZSM-48 crystals made according to the above embodiments have a relatively low silica:alumina ratio. This lower silica:alumina ratio mean that the present catalysts are more acidic. In spite of this increased acidity, they have superior activity and selectivity as well as excellent yields. They also have environmental benefits from the standpoint of health effects from crystal form and the small crystal size is also beneficial to catalyst activity.

For catalysts according to the invention that incorporate ZSM-23, any suitable method for producing ZSM-23 with a low $SiO_2:Al_2O_3$ ratio may be used. U.S. Pat. No. 5,332,566 provides an example of a synthesis method suitable for producing ZSM-23 with a low ratio of $SiO_2:Al_2O_3$. For example, a directing agent suitable for preparing ZSM-23 can be formed by methylating iminobispropylamine with an excess of iodomethane. The methylation is achieved by adding the iodomethane dropwise to iminobispropylamine which is solvated in absolute ethanol. The mixture is heated to a reflux temperature of 77° C. for 18 hours. The resulting solid product is filtered and washed with absolute ethanol.

The directing agent produced by the above method can then be mixed with colloidal silica sol (30% $SiO_2$), a source of alumina, a source of alkali cations (such as Na or K), and deionized water to form a hydrogel. The alumina source can be any convenient source, such as alumina sulfate or sodium aluminate. The solution is then heated to a crystallization temperature, such as 170° C., and the resulting ZSM-23 crystals are dried. The ZSM-23 crystals can then be combined with a low surface area binder to form a catalyst according to the invention.

The following Examples further illustrate the benefits of the claimed invention. In the Examples, the activity of the catalysts was determined using either a 600N feedstock or a 130N feedstock. The 130N feedstock contained 66 wppm of nitrogen and 0.63 wt % of sulfur. The 600N feedstock contained similar levels of nitrogen and sulfur.

EXAMPLE 1 (COMPARATIVE)

65/35 ZSM-48(Si/Al2 180/1)/$Al_2O_3$ Steamed (3 hours@890F)—with and without 0.6 wt % Pt An extrudate consisting of 65 wt % ZSM-48(Si/$Al_2$ 180/1) and 35 wt % alumina was steamed for 3 hours at 890° F. The surface area of the binder prior to formulation was at least 170 $m^2$/g, and the ratio of zeolite surface area to external surface area was less than 50:100. A sample of the steamed extrudate was loaded with 0.6 wt % Pt by incipient wetness impregnation with platinum tetraammine nitrate, drying at 250° F. and calcining in full air at 680° F. for 3 hours.

A batch micro-autoclave system was used to test the activity of the above catalyst with and without the addition of 0.6 wt % Pt. For the catalyst with 0.6 wt % Pt, 212.48 mg of the catalyst was reduced under hydrogen followed by the addition of 2.5 grams of the 600N feedstock. The "space velocity" was 1.02. The reaction was run at 400 psig at 345° C. for 12 hours. The resulting pour point of the TLP was −21° C. (decreased from approximately 50° C.).

For the catalyst without the addition of 0.6 wt % Pt, 201.13 mg catalyst was reduced under hydrogen followed by the addition of 2.5 grams 600N. The "space velocity" was 1.08. The reaction was run at 400 psig at 345° C. for 12 hours. The resulting pour point of the TLP was 8° C. (decreased from approximately 50° C.).

These activity tests for pour point reduction demonstrate the value of including a metal hydrogenation component for a ZSM-48 catalyst with a high Si/$Al_2$ ratio and a high surface area binder.

EXAMPLE 2

65/35 ZSM-48(Si/Al2 90/1)/Al2O3 Steamed (3 hours@890F)—with and without 0.6 wt % Pt An extrudate consisting of 65 wt % ZSM-48(Si/$Al_2$ 90/1) and 35 wt % alumina was steamed for 3 hours at 890° F. The surface area of the binder prior to formulation was at least 170 $m^2$/g, and the ratio of zeolite surface area to external surface area was less than 50:100. A sample of the steamed extrudate was loaded with 0.6 wt % Pt by incipient wetness impregnation with platinum tetraammine nitrate, drying at 250° F. and calcining in full air at 680° F. for 3 hours.

A batch micro-autoclave system was used to test the activity of the above catalyst with and without the addition of 0.6 wt % Pt. For the catalyst with 0.6 wt % Pt, 209.60 mg and 102.26 mg of catalyst were loaded in separate wells and reduced under hydrogen, followed by the addition of 2.5 grams of 600N feedstock. The "space velocity" was 1.04 and 2.11 respectively. The reaction was run at 400 psig at 345° C. for 12 hours. The resulting pour point of the total liquid product was −30° C. at 1.04 WHSV and 7° C. at 2.11 WHSV (decreased from approximately 50° C.).

For the catalyst without the 0.6 wt % Pt, 211.87 mg and 111.97 mg of catalyst were loaded in separate wells and reduced under hydrogen, followed by the addition of 2.5 grams of 600N feedstock. The "space velocity" was 1.02 and 1.92 respectively. The reaction was run at 400 psig at 345° C. for 12 hours. The resulting pour point of the total liquid product was −24° C. at 1.02 WHSV and −8° C. at 1.92 WHSV (decreased from approximately 50° C.).

The activity tests on the above catalysts still show a substantial spread between the pour points produced with and without the metal hydrogenation function. The difference in pour point achieved is smaller than for the catalysts with the higher $Si/Al_2$ ratios in Examples 1, but the difference is still significant.

EXAMPLE 3

65/35 ZSM-48 (Si/Al2 90/1)/$TiO_2$—with and without 0.6 wt % Pt

An extrudate consisting of 65 wt % ZSM-48(Si/Al2 90/1) and 35 wt % Titania was loaded with 0.6 wt % Pt by incipient wetness impregnation with platinum tetraammine nitrate, drying at 250° F. and calcining in full air at 680° F. for 3 hours. A second extrudate of the ZSM-48/$TiO_2$ catalyst was also prepared without addition of the 0.6 wt % Pt. The surface area of the titania binder prior to formulation was less than 100 $m^2$/g. The ratio of zeolite surface area to external surface area for the resulting catalysts was at least 85:100.

A batch micro-autoclave system was used to test the activity of the above catalyst with and without the addition of 0.6 wt % Pt. For the catalyst with 0.6 wt % Pt, 120.87 mg of catalyst was reduced under hydrogen followed by the addition of 2.5 grams of 130N feedstock. The "space velocity" was 1.75. The reaction was run at 400 psig at 330° C. for 12 hours. The resulting pour point of the total liquid product was −40° C. at (decreased from approximately 30° C.).

For the catalyst without the 0.6 wt % Pt, 120.81 mg of catalyst was reduced under hydrogen followed by the addition of 2.5 grams of 130N feedstock. The "space velocity" was 1.75. The reaction was run at 400 psig at 330° C. for 12 hours. The resulting pour point of the total liquid product was −42° C. at (decreased from approximately 30° C.).

The above activity tests show that for a catalyst with a low $Si/Al_2$ ratio and a low surface area binder, the metal hydrogenation function has little impact on the catalyst activity.

EXAMPLE 4

65/35 ZSM-48 (Si/Al2 70/1)/$TiO_2$—with and without 0.6 wt % Pt

An extrudate consisting of 65 wt % ZSM-48(Si/Al2 70/1) and 35 wt % Titania was loaded with 0.6 wt % Pt by incipient wetness impregnation with platinum tetraammine nitrate, drying at 250° F. and calcining in full air at 680° F. for 3 hours. A second extrudate of the ZSM-48/TiO2 catalyst was also prepared without addition of the 0.6 wt % Pt. The surface area of the titania binder prior to formulation was less than 100 $m^2$/g. The ratio of zeolite surface area to external surface area for the resulting catalysts was at least 85:100.

A batch micro-autoclave system was used to test the activity of the above catalyst with and without the addition of 0.6 wt % Pt. For the catalyst with 0.6 wt % Pt, 85.38 mg and 63.05 mg of catalyst were loaded in separate wells and reduced under hydrogen, followed by the addition of 2.5 grams 600N. The "space velocity" was 2.53 and 3.43 respectively. The reaction was run at 400 psig at 345° C. for 12 hours. The resulting pour point of the TLP was −25° C. at 2.53 WHSV and −9° C. at 3.43 WHSV (decreased from approx 50° C.).

For the catalyst without the 0.6 wt % Pt, 87.06 mg and 61.58 mg of catalyst were loaded in separate wells and reduced under hydrogen, followed by the addition of 2.5 grams of 600N feedstock. The "space velocity" was 2.48 and 3.50 respectively. The reaction was run at 400 psig at 345° C. for 12 hours. The resulting pour point of the TLP was −23° C. at 2.48 WHSV and −11° C. at 3.50 WHSV (decreased from approx 50° C.).

The above activity tests show that even at high space velocity, catalysts including ZSM-48 with a low $Si/Al_2$ ratio and a low surface area binder can produce good dewaxing activity. Additionally, the presence of a metal hydrogenation component did not materially change the dewaxing activity of the catalyst.

EXAMPLE 5

65/35 ZSM-48 (Si/Al2 90/1)/$SiO_2$—with and without 0.6 wt % Pt

An extrudate consisting of 65 wt % ZSM-48(Si/Al2 90/1) and 35 wt % Silica was loaded with 0.6 wt % Pt by incipient wetness impregnation with platinum tetraammine nitrate, drying at 250° F. and calcining in full air at 680° F. for 3 hours. A second extrudate of the ZSM-48/$SiO_2$ catalyst was also prepared without addition of the 0.6 wt % Pt. The surface area of the silica binder prior to formulation was less than 100 $m^2$/g. The ratio of zeolite surface area to external surface area for the resulting catalysts was greater than 85:100.

A batch micro-autoclave system was used to test the activity of the above catalyst with and without the addition of 0.6 wt % Pt. For the catalyst with 0.6 wt % Pt, 214.11 mg and 104.03 mg of catalyst were loaded in separate wells and reduced under hydrogen, followed by the addition of 2.5 grams of 600N feedstock. The "space velocity" was 1.00 and 2.07 respectively. The reaction was run at 400 psig at 345° C. for 12 hours. The resulting pour point of the total liquid product was −28° C. at 1.00 WHSV and −23° C. at 2.07 WHSV (decreased from approximately 50° C.).

For the catalyst without the 0.6 wt % Pt, 215.29 mg and 104.09 mg of catalyst were loaded in separate wells and reduced under hydrogen, followed by the addition of 2.5 grams of 600N feedstock. The "space velocity" was 1.00 and 2.06 respectively. The reaction was run at 400 psig at 345deg C. for 12 hours. The resulting pour point of the TLP was −28° C. at 1.00 WHSV and −20° C. at 2.06 WHSV (decreased from approx 50° C.).

EXAMPLE 6

Yield Versus Pour Point for 65/35 ZSM-48 Steamed (3 hours @890F) (Si/Al2 90/1)/$TiO_2$—with and without 0.6 wt % Pt An extrudate consisting of 65 wt % 90:1 $SiO_2$:$Al_2O_3$/35 wt % $TiO_2$ was steamed for 3 hours at 890° F. The catalyst was used to process a 600N lube oil feedstock at 0.5 LHSV, 400 psig, and 5500 SCF/B hydrogen. The feedstock contained <1 wt % material boiling below 700° F. The total liquid product was distilled to remove 700° C.− hydrocarbons. The 700° C.+ product was tested for pour point and VI. The results from this activity test are plotted as squares in FIGS. 1 and 2. Yield vs. pour point is plotted as in FIG. 1. The VI at −5° C. pour point was measured to be 96. The reactor temperature required to achieve −6° C. pour point is plotted vs. days on stream in FIG. 2.

Figure 2:
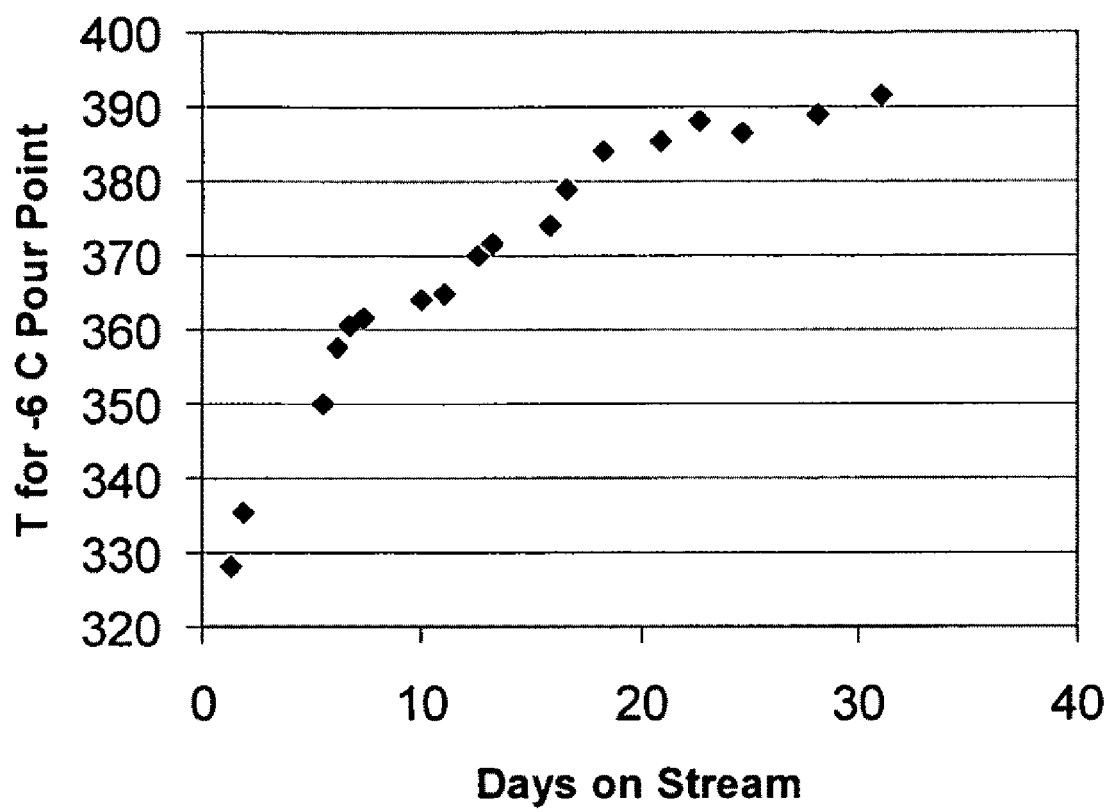
Figure 3:
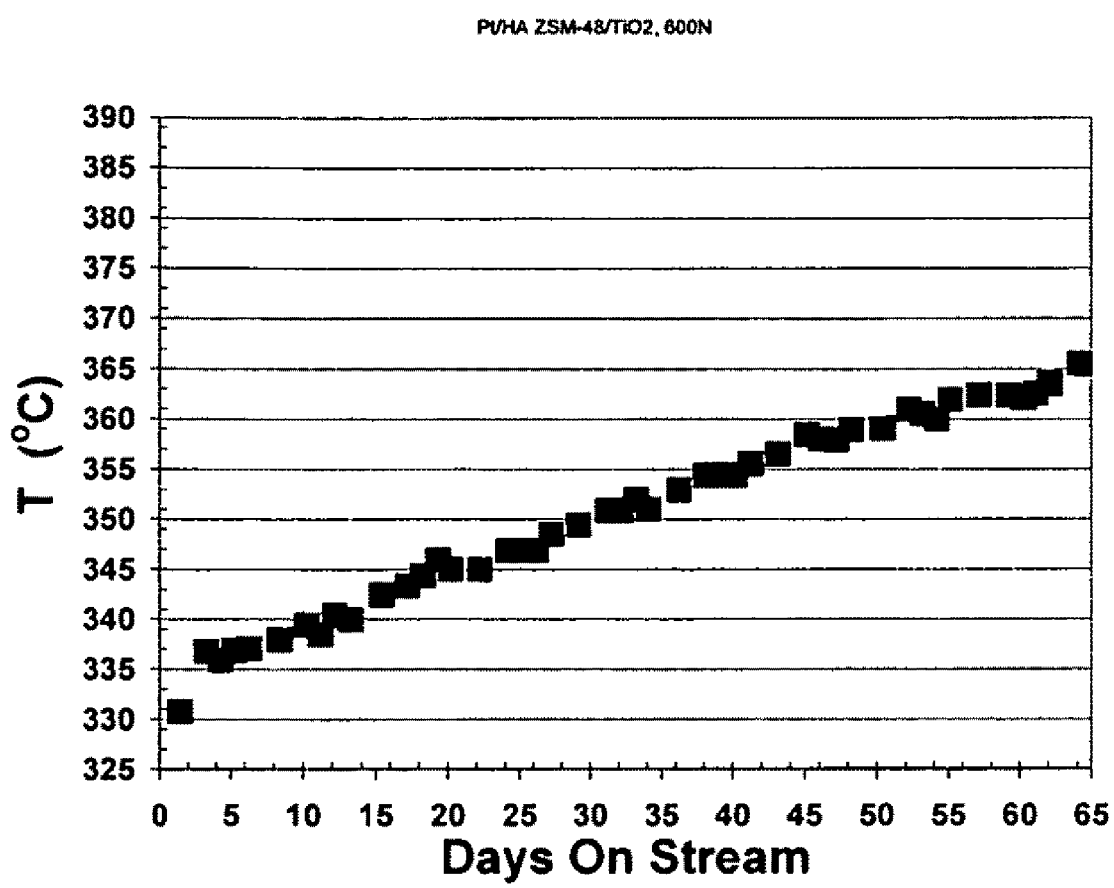

A similar extrudate that included a metal hydrogenation function was also prepared. An extrudate consisting of 0.6 wt % Pt supported on 65 wt % 90:1 $SiO_2$:$Al_2O_3$/35 wt % $TiO_2$ was steamed for 3 hours at 890° F. The catalyst was used to process a 600N lube oil feedstock at 0.5 LHSV, 400 psig, and 5500 SCF/B hydrogen. The feedstock contained <1 wt % material boiling below 700° F. The total liquid product was distilled to remove 700° C.− hydrocarbons. The 700° C.+ product was tested for pour point and VI. The results from this activity test are plotted as diamonds in FIGS. 1 and 3. As in FIG. 2, FIG. 3 shows the reactor temperature required to achieve a −6° C. pour point. As shown in FIG. 1, the VI at −5° C. pour point was measured to be 104.

The activity tests shown in FIGS. 1-3 demonstrate that metal-free ZSM-48/TiO$_2$ extrudates are a surprisingly good dewaxing catalyst. In the above activity tests, the metal free catalyst has the same start of cycle temperature as the catalyst that includes a metal hydrogenation component. Although the metal-free catalyst ages faster at the beginning of the run, by day 30 the activity is lining out and the deactivation rate is similar to the metal containing catalyst. As would be expected, it is believed that the metal free catalyst does more hydrocracking and less hydroisomerization. As a consequence the metal free catalyst has lower yield and VI at constant pour point. The differences, however, are minor. This means that the metal free catalyst surprisingly has similar dewaxing performance as the metal-containing catalyst but removes no sulfur and consumes no hydrogen.

What is claimed is:

1. A catalyst comprising:
    a zeolite having a SiO$_2$:Al$_2$O$_3$ ratio of 100 or less, the zeolite being ZSM-48, ZSM-23, EU-2, EU-11, ZBM-30, or a combination thereof;
    0 wt % of an added metal hydrogenation component; and
    a metal oxide binder, wherein the metal oxide binder in powder form has a surface area of 80 m$^2$/g or less;
    wherein the catalyst has a ratio of zeolite surface area to external surface area of at least 80:100.
2. The catalyst of claim 1, wherein the zeolite is ZSM-48.
3. The catalyst of claim 1, wherein the ratio of SiO$_2$:Al$_2$O$_3$ is 80 or less.
4. The catalyst of claim 1, wherein the ratio of SiO$_2$:Al$_2$O$_3$ is 75 or less.
5. The catalyst of claim 1, wherein the ratio of SiO$_2$:Al$_2$O$_3$ is 60 or less.
6. The catalyst of claim 1, wherein the metal oxide binder has a surface area of 60 m$^2$/g or less.
7. The catalyst of claim 1, wherein the catalyst has a ratio of zeolite surface area to external surface area of at least 90:100.
8. The catalyst of claim 1, wherein the catalyst has a ratio of zeolite surface area to external surface area of at least 1:1.
9. The catalyst of claim 1, wherein the has a ratio of zeolite surface area to external surface area of at least 105:100.
10. The catalyst of claim 1, wherein the binder is silica, alumina, titania, zirconia, or silica-alumina.
11. The catalyst of claim 1, wherein the binder further comprises a second metal oxide different from the first metal oxide.
12. The catalyst of claim 11, wherein a weight percentage of the second metal oxide in the catalyst is lower than a weight percentage of the first metal oxide, the first metal oxide in powder form having a surface area of 80 m$^2$/g or less.
13. The catalyst of claim 12, wherein the second metal oxide is a silica, alumina, titania, zirconia, or silica-alumina.

* * * * *